United States Patent [19]

Cuypers

[11] Patent Number: 5,247,856
[45] Date of Patent: Sep. 28, 1993

[54] GEAR TRANSMISSION BETWEEN AN INPUT SHAFT AND TWO CONTRAROTATING CONCENTRIC OUTPUT SHAFTS

[75] Inventor: Martinus H. Cuypers, Eindhoven, Netherlands

[73] Assignee: Crown Gear B.V., Netherlands

[21] Appl. No.: 720,818

[22] PCT Filed: Jan. 9, 1990

[86] PCT No.: PCT/NL90/00002
§ 371 Date: Jul. 11, 1991
§ 102(e) Date: Jul. 11, 1991

[87] PCT Pub. No.: WO90/08271
PCT Pub. Date: Jul. 26, 1990

[30] Foreign Application Priority Data

Jan. 11, 1989 [NL] Netherlands ............... 8900062

[51] Int. Cl.⁵ ............... F16H 1/22; B63H 5/10
[52] U.S. Cl. ............... 74/665 F; 74/665 K; 74/665 L
[58] Field of Search ............... 74/665 H, 665 F, 665 G, 74/665 GA, 665 K, 665 L, 665 M, 665 N; 475/331, 332, 339, 340

[56] References Cited

U.S. PATENT DOCUMENTS

| | | | |
|---|---|---|---|
| 1,800,094 | 4/1931 | Muhlenbruck | 74/665 K |
| 2,067,203 | 1/1937 | Schleicher | 74/665 K |
| 2,395,610 | 2/1946 | Cavallaro | 74/665 K |
| 2,987,031 | 6/1961 | Odden | 440/81 |
| 3,469,708 | 9/1969 | Pennington | 74/665 K X |
| 3,889,771 | 6/1975 | Kronogard | 74/DIG. 5 X |
| 4,792,314 | 12/1988 | McCormick | 74/665 K |

FOREIGN PATENT DOCUMENTS

| | | | |
|---|---|---|---|
| 8803194 | 7/1988 | Fed. Rep. of Germany . | |
| 1473407 | 3/1967 | France . | |
| 8800415 | 9/1989 | Netherlands | 475/331 X |
| 538731 | 8/1941 | United Kingdom . | |

Primary Examiner—Leslie A. Braun
Assistant Examiner—Khoi Ta
Attorney, Agent, or Firm—Ostrolenk, Faber, Gerg & Soffen

[57] ABSTRACT

A device for contra-rotating two concentric shafts. One shaft is hollow in order to accommodate the other shaft. At least one drive shaft is connected to a power source and the concentric shafts are connected to each other by a geared transmission. The transmission includes one or more crown wheels which mesh with cylindrical pinions.

4 Claims, 5 Drawing Sheets

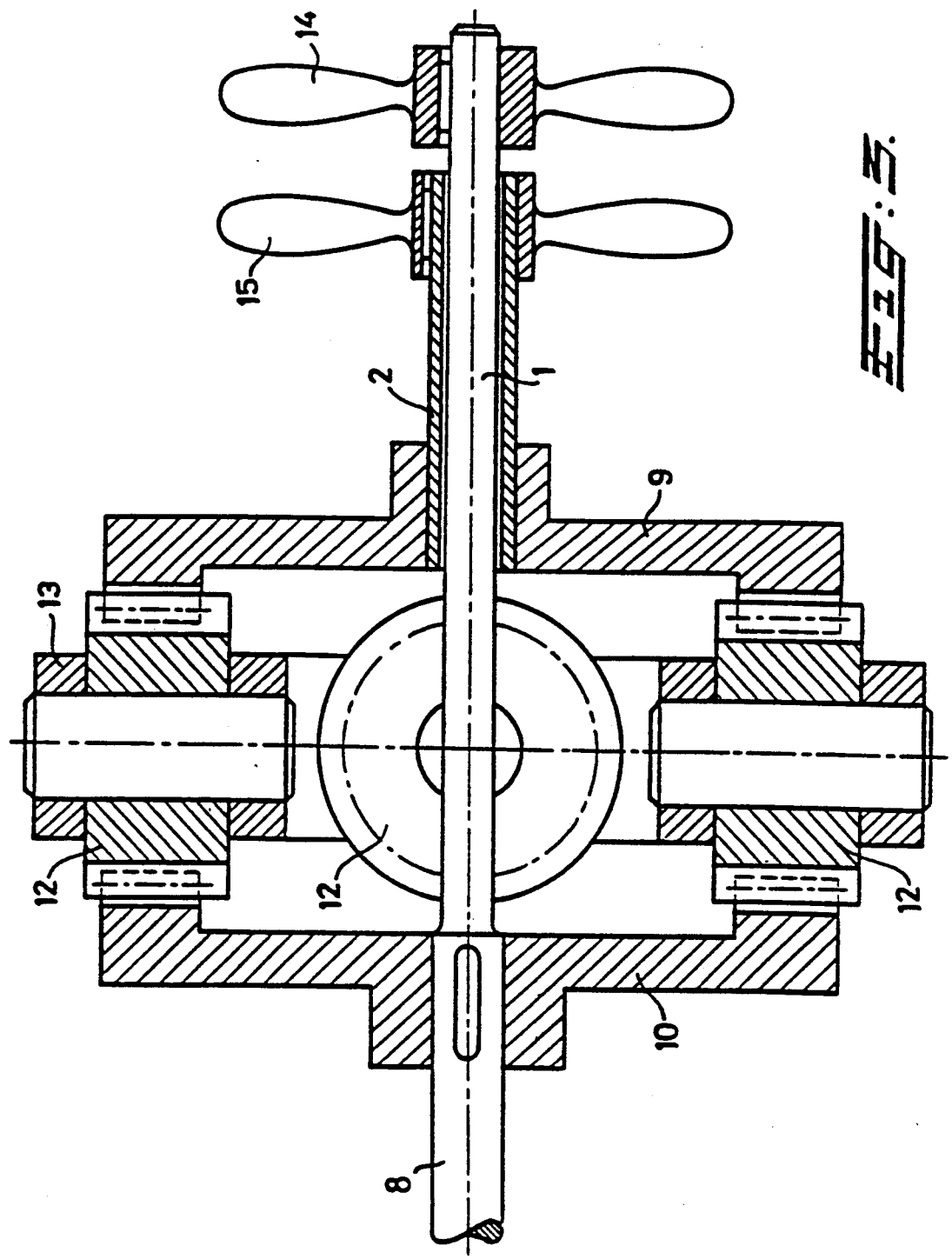

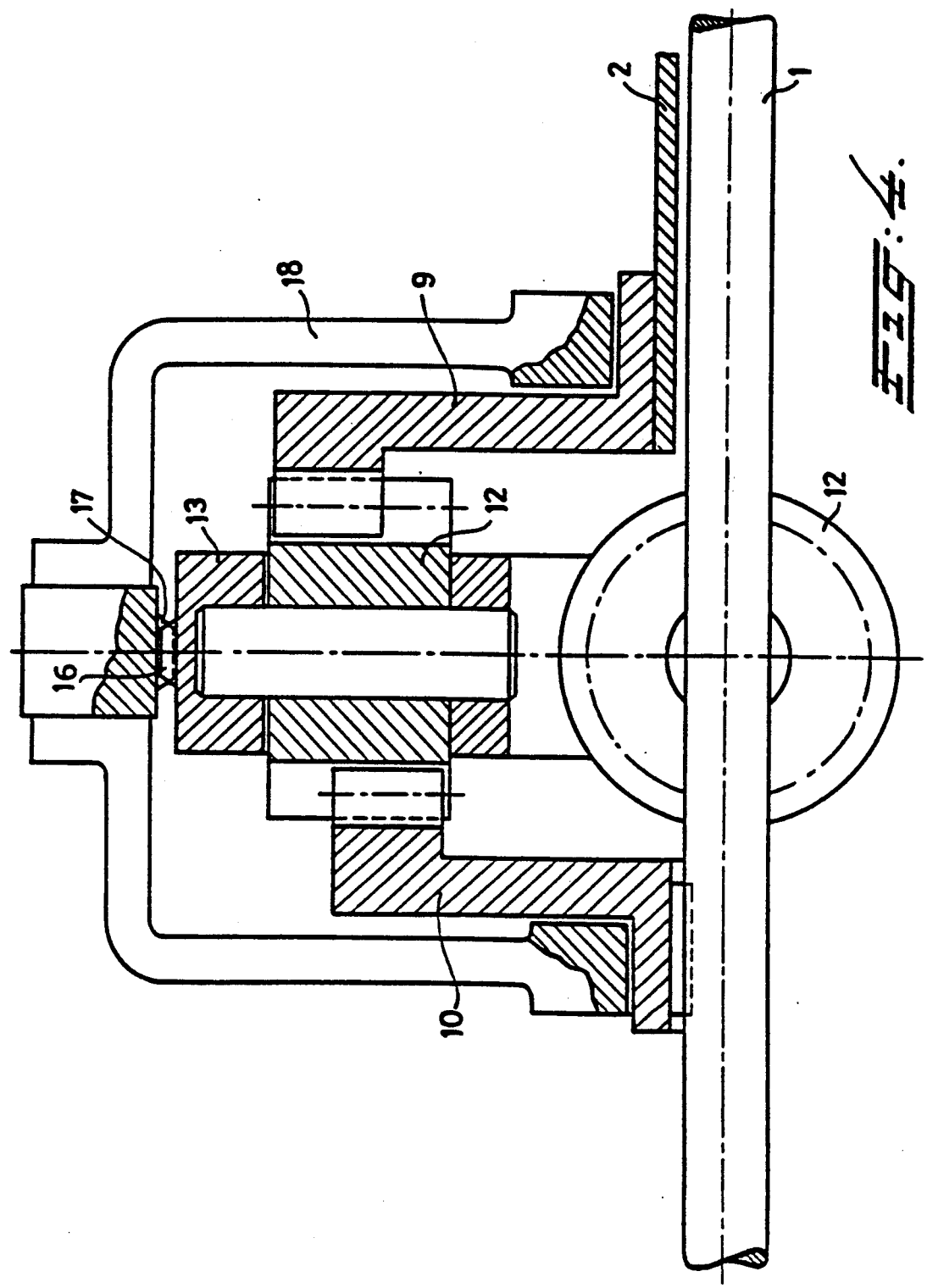

GEAR TRANSMISSION BETWEEN AN INPUT SHAFT AND TWO CONTRAROTATING CONCENTRIC OUTPUT SHAFTS

The invention relates to a gear transmission between an input shaft and two contra-rotating concentric output shafts consisting of a hollow outer shaft and an inner shaft extending through the hollow outer shaft, the input shaft being in line with and connected to the inner shaft, said gear transmission comprising a first gear rigidly connected to the input shaft and the inner shaft, a second gear rigidly connected to the hollow outer shaft, and at least two intermediate gears meshing with the first and second gears and having their axes perpendicular to the concentric shafts, thereby forming right-angle transmissions.

A gear transmission of this type is disclosed U.S. application Pat. No. 4 792 314. This known gear transmission comprises a first bevel gear rigidly connected to the input shaft and the inner shaft, a second bevel gear rigidly connected to the hollow outer shaft and two diametrically opposite intermediate bevel gears meshing with the first and second bevel gears. Each bevel gear has substantially the same diameter, so that the transmission ratio of each right-angle transmission is substantially 1:1.

The object of the invention is to provide an improved gear transmission between an input shaft and two contra-rotating concentric output shafts, in which the meshing gears can be adjusted easily, and which has a high load transmitting capacity due to an improved mesh of the gears.

This object is achieved by a gear transmission of the abovementioned type which is characterized in that each right-angle transmission comprises a cylindrical pinion and a crown wheel meshing with said pinion, the number of teeth of the crown wheel being at least 1.5 times the number of teeth of the cylindrical pinion, thus rendering a transmission ratio between the crown wheel and the cylindrical pinion of at least 1.5.

The invention is based on the idea that in a gear transmission according to the invention two or more cylindrical pinions can mesh with the crown wheels, while maintaining the perfect mesh between the pinions and the crown wheels required for a high load transmitting capacity. A gear transmission according to the invention comprising two or more cylindrical pinions and two crown wheels is compact and efficient.

DE-U-88 03 194 discloses a gear transmission in which the transmission ratio the crown wheel(s) and the cylindrical pinion is more than 1. However, this gear transmission is of another type, in which the input shaft is not in line with the output shafts.

The invention also relates to a gear transmission between an input shaft and two contra-rotating concentric output shafts consisting of a hollow outer shaft and an inner shaft extending through the hollow outer shaft, said gear transmission comprising a first crown wheel rigidly connected to the inner shaft, a second crown wheel rigidly connected to the outer shaft and at least one intermediate cylindrical pinion meshing with the first and second crown wheels and having its axis perpendicular to the concentric shafts, the input shaft being rigidly connected to the cylindrical pinion, as disclosed in DE-U-88 031 94, which is characterized in that the number of teeth of the first and second crown wheels is different and/or that at least two input shafts are provided, each input shaft being rigidly connected to a cylindrical pinion meshing with the first and second crown wheels.

The invention is explained in greater detail with reference to the drawings, in which:

FIG. 3 shows schematically a third embodiment of the device; and

FIG. 4 shows a variant of the embodiment according to FIG. 3.

Figure 1:
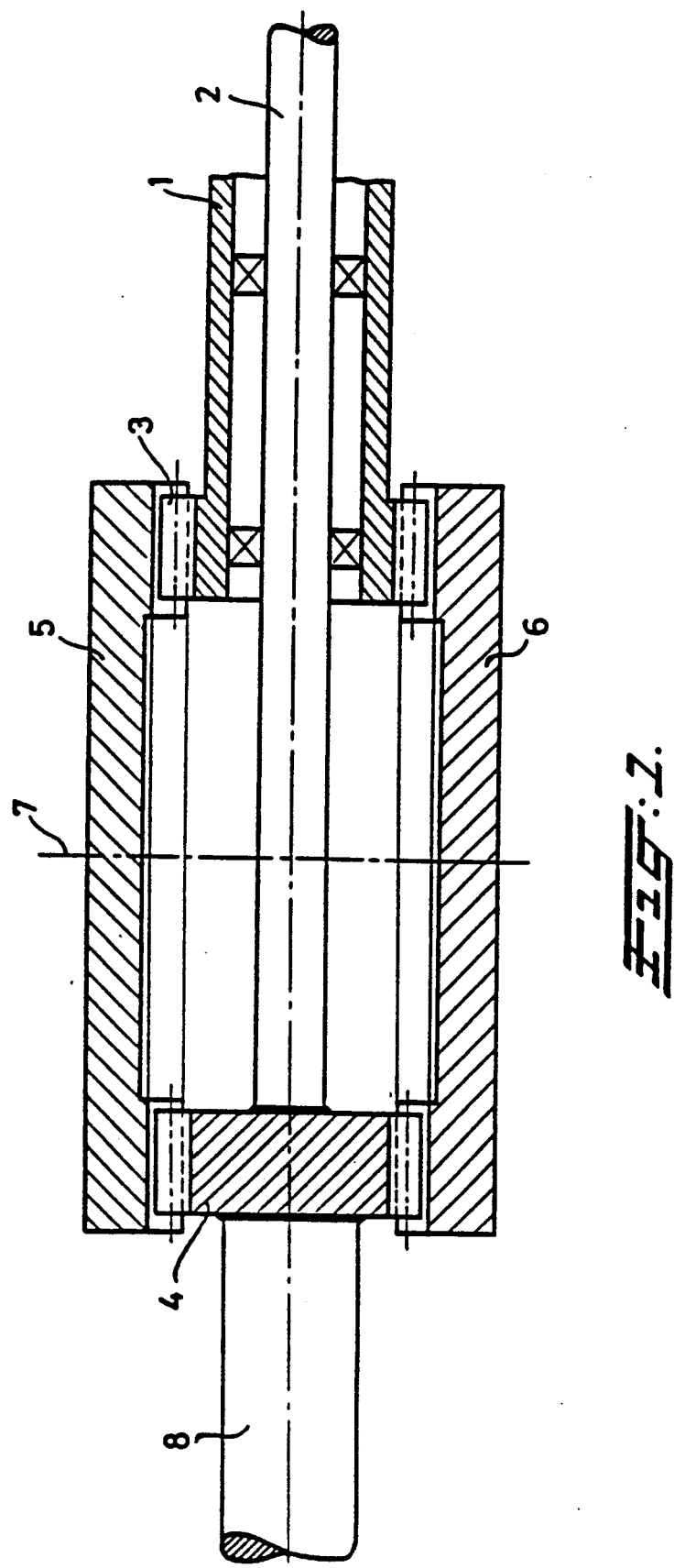
FIG. 1 shows schematically a first embodiment of a gear transmission according to the invention.

FIG. 1 shows a hollow shaft 1 with a shaft 2 running concentrically through it. These concentric shafts can each be connected to, for example, a propeller or driving screw which are driven in opposite directions. Such driving systems are currently in increasing use in aircrafts (prop-fan) and ships.

Each of the concentric shafts 1, 2 is provided with a cylindrical pinion 3, 4, said pinions having identical teeth and being meshed diametrically opposite each other with two crown wheels 5 and 6. The two crown wheels face each other with their teeth and rotate about a common axis 7, so that these crown wheels rotate in opposite directions of rotation.

In the embodiment shown in FIG. 1 a drive shaft 8 is connected in a rotation-free manner to the pinion 4 of the internal shaft 2. The drive shaft thus lies in line with the two concentric shafts 1, 2. It is, however, also possible to connect the drive shaft 8 in a rotation-free manner to one of the crown wheels 5, 6, this shaft then forming an angle of 90° with the concentric shafts 1, 2. It will also be clear that it is possible in principle to make do with only one crown wheel in the embodiment described above.

Figure 2:
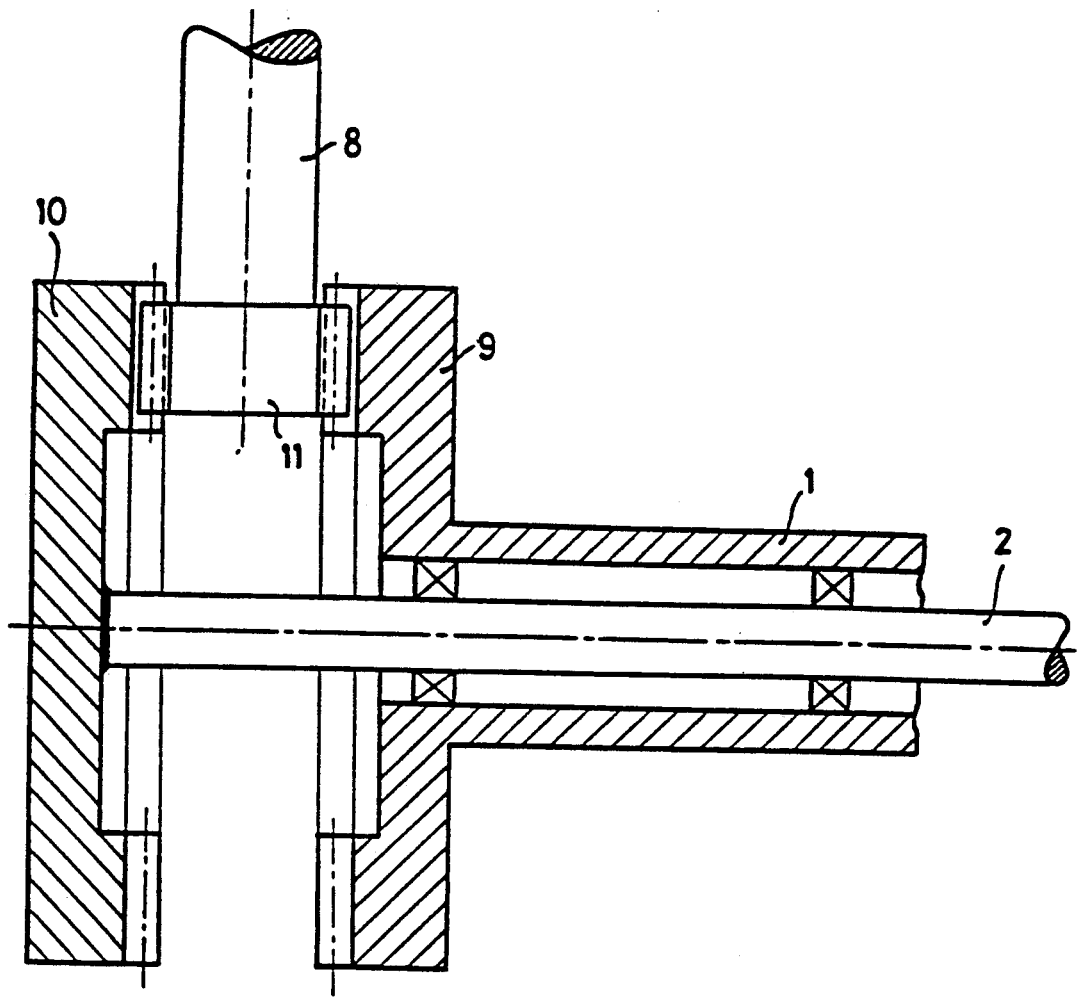
FIG. 2 shows schematically a second embodiment of a gear transmission according to the invention.
Figure 2A:
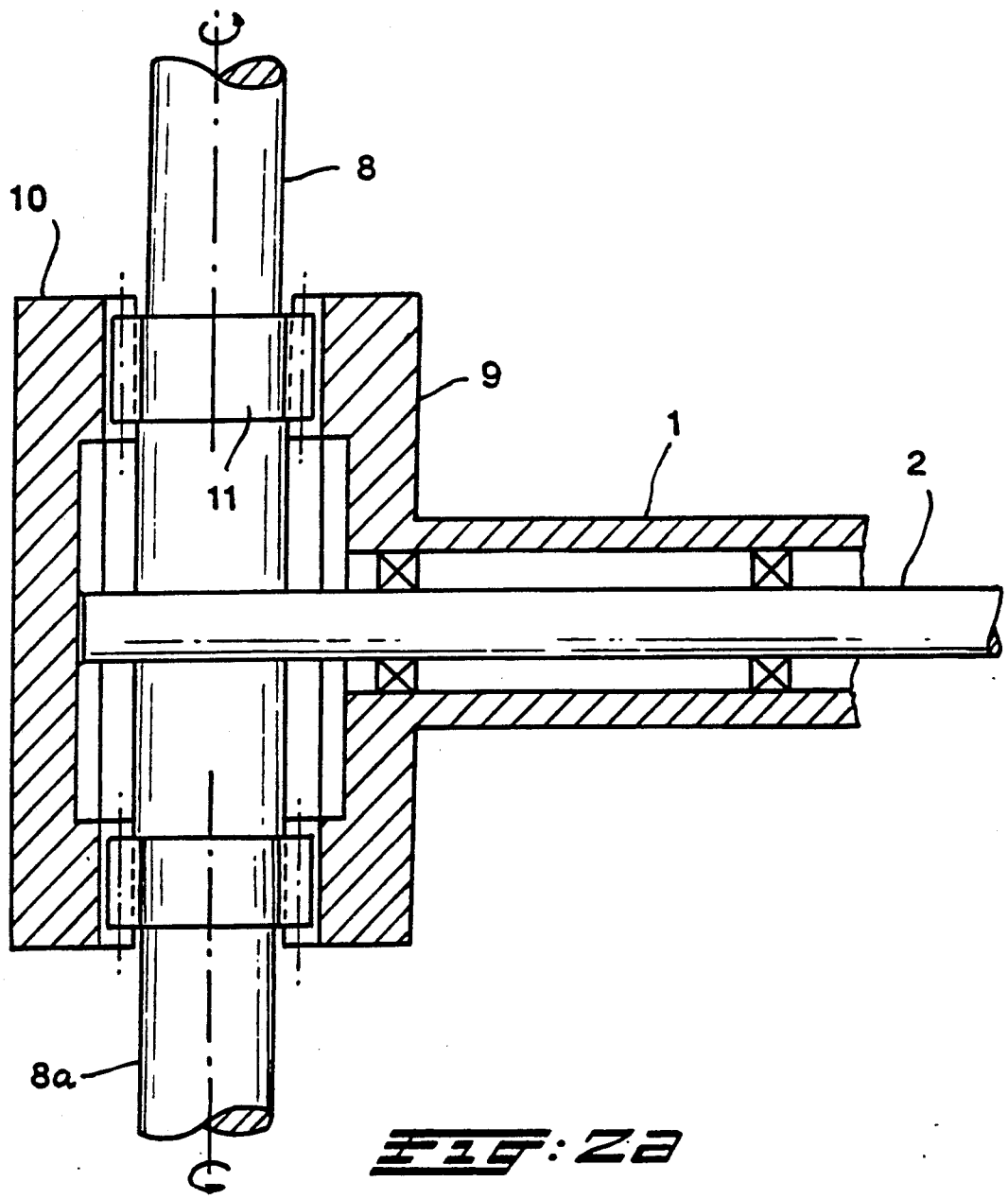
FIG. 2a shows schematically a variation of the second embodiment.

With such a design it is also possible to drive the concentric shafts with power coming from different sources, as shown in FIG. 2a where an additional drive 8a is shown. In this embodiment two input shafts are provided, a first input shaft and a second input shaft, each shaft being rigidly connected to a cylindrical pinion and meshing with first and second crown wheels. Instead of with the pinion 4, the two crown wheels can also be driven directly by a different power source, in which case an accelerating transmission is obtained. It is also possible to drive the two crown wheels by means of pinions which are meshed with the two crown wheels, and each of which is connected in a rotation-free manner to a drive shaft.

FIG. 2 shows a different embodiment of the invention, in which each of the concentric shafts is connected in a rotation-free manner to a crown wheel 9, 10. The two crown wheels face each other with their teeth and both rotate about the common axis of the concentric shafts. The drive shaft 8 is provided with a cylindrical pinion 11 which meshes with the two crown wheels 9, 10. Rotation of the drive shaft 8 causes the crown wheels 9, 10, and thus the concentric shafts, to rotate in opposite directions.

FIG. 3 shows schematically another embodiment of the device, in which each of the concentric shafts 1, 2 bears a crown wheel 9, 10 which is connected to it in a rotation-free manner. The drive shaft 8 is in this case also connected in a rotation-free manner to the crown wheel 10, and in practice the drive shaft 8 is integral with the concentric shaft 1. Disposed between the two crown wheels 9, 10 are a number of cylindrical pinions 12 which are fitted at intervals in a freely rotating manner in an annular holder 13. This annular holder 13 is connected to a fixed point in the environment such as, for example, the housing of the geared transmission. Four of such pinions 12 are present in the embodiment shown in FIG. 3. This means that approximately 50% of the power supplied through the shaft 8 passes through the shaft 1 to the front propeller 14. The remaining 50% imparted via the crown wheel to the four pinions, so that each pinion transmits approximately $\frac{1}{4} \times 50 \times 12.5\%$ of the power to the crown wheel 9. The total power imparted to the crown wheel 9 is thus also approximately 50%, and it is subsequently conveyed via the hollow shaft 2 to the rear propeller 15.

It will be clear that any other desired number of pinions 12 can be fitted between the two crown wheels. This design has the major advantage that the tooth loads of the two crown wheels are reduced considerably, so that these crown wheels can be made smaller, with the result that the overall radial dimensions of the geared transmission can be reduced.

FIG. 4 shows a part of a variant of the device shown in FIG. 3, in which the crown wheel 9 has a larger number of teeth than the crown wheel 10, so that the propeller 15 will rotate correspondingly more slowly than the propeller 14. This design is particularly simple to produce by means of crown wheels, and it need only be ensured that the pinions 12 are wide enough to permit them to mesh simultaneously with both the crown wheel 10 and the crown wheel 9. In conventional bevel gear transmissions it is impossible to make the concentric shafts rotate at different speeds, at least if the shafts of the pinions have to be in line with each other.

In FIG. 4 the annular holder 13 is also provided on the outer periphery with a spline joint 16 which is in mesh with a corresponding spline joint 17 of the fixed housing 18.

The main advantages of the design according to the invention compared with the conventional use of bevel gears are that the geared transmission is lighter and is of smaller radial dimensions. This is extremely important in the aircraft industry in particular. Besides, cylindrical pinions are very cheap to make, so that the possibly more expensive production of the crown wheels is amply made up for by this.

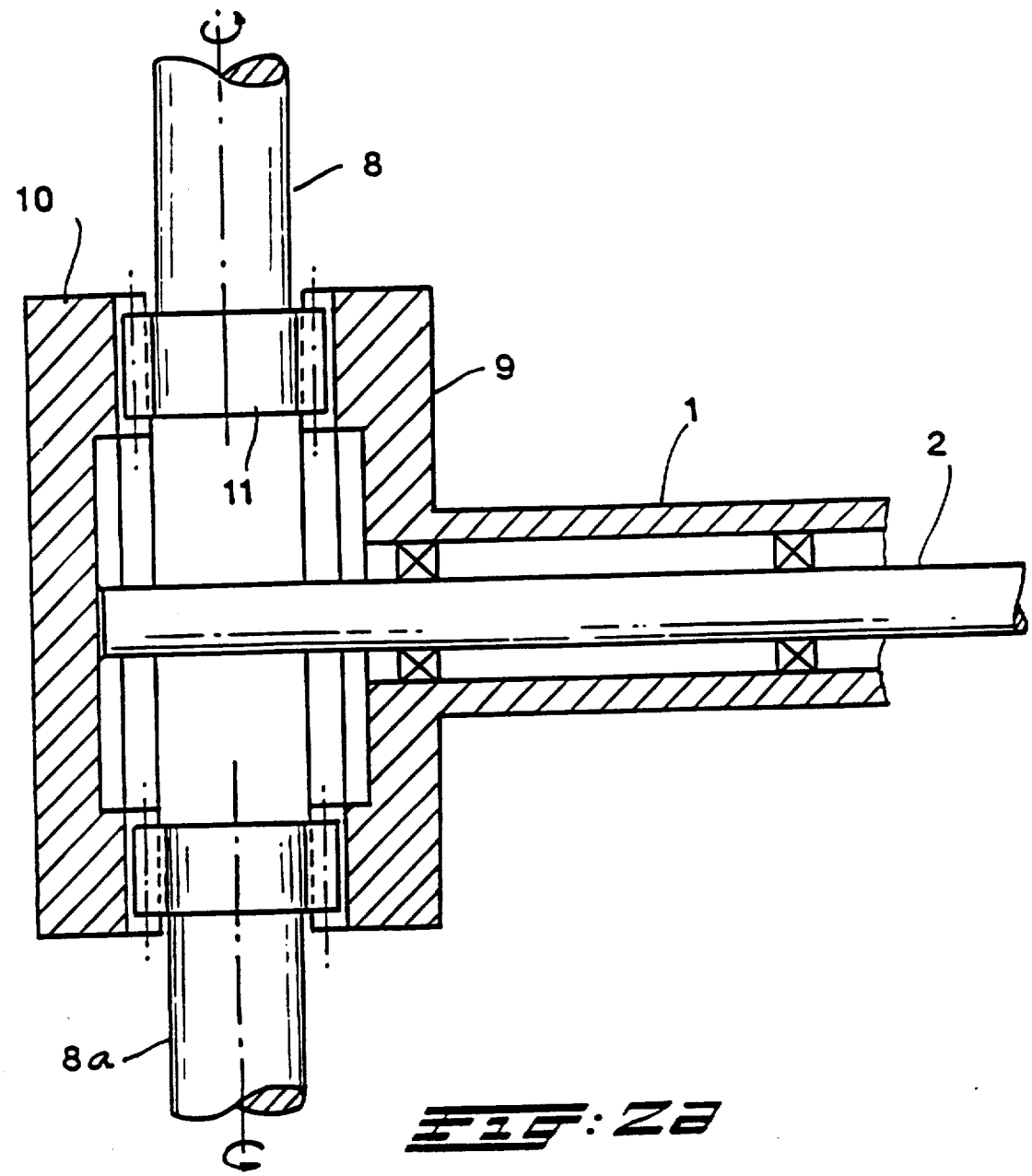

I claim:

1. Gear transmission between an input shaft and two contra-rotating concentric output shafts comprising a hollow outer shaft and an inner shaft extending through the hollow outer shaft, the input shaft being in line with and connected to the inner shaft, said gear transmission comprising a first gear connected in a rotation free manner to the input shaft and the inner shaft, a second gear connected in a rotation free manner to the hollow outer shaft, and at least two intermediate gears meshing with the first and second gears and having their axes perpendicular to the concentric shafts, wherein the first and second gears are crown wheels and the intermediate gears are cylindrical pinions, the number of teeth of the crown wheel being at least 1.5 times the number of teeth of the cylindrical pinion, thus rendering a transmission ratio between the crown wheel and the cylindrical pinion of at least 1.5.

2. Gear transmission of claim 1, wherein the number of intermediate cylindrical pinions is more than two.

3. Gear transmission of claim 1, wherein the number of teeth of the first and second gears is different.

4. Gear transmission between an input shaft and two contra-rotating concentric output shafts comprising a hollow outer shaft and an inner shaft extending through the hollow outer shaft, said gear transmission comprising a first crown wheel rigidly connected to the inner shaft, a second crown wheel rigidly connected to the outer shaft, at least two intermediate cylindrical pinions meshing with the first and second crown wheels and having their axes perpendicular to the concentric shafts, a first input shaft, and a second input shaft, each input shaft being rigidly connected to a cylindrical pinion meshing with the first and second crown wheels.

* * * * *

UNITED STATES PATENT AND TRADEMARK OFFICE
CERTIFICATE OF CORRECTION

PATENT NO. : 5,247,856

DATED : September 28, 1993

INVENTOR(S) : Martinus Hubertus Cuypers

It is certified that error appears in the above-identified patent and that said Letters Patent is hereby corrected as shown below:

In the Drawings:
Delete Fig. 2a and replace it with the corrected Fig. 2a as shown on the attached sheet.

Signed and Sealed this

Tenth Day of May, 1994

Attest:

BRUCE LEHMAN

Attesting Officer

Commissioner of Patents and Trademarks